United States Patent [19]

Candler

[11] Patent Number: 4,709,869
[45] Date of Patent: Dec. 1, 1987

[54] FILM STORAGE SYSTEM

[76] Inventor: Darrell E. Candler, 10651 Vandergriff Rd., Indianapolis, Ind. 46239

[21] Appl. No.: 851,821

[22] Filed: Apr. 14, 1986

[51] Int. Cl.$^4$ .................. B65H 18/00; G09F 11/18; B65B 63/04; B42D 1/00
[52] U.S. Cl. .................. 242/673 R; 40/471; 53/118; 53/430; 281/2; 281/5
[58] Field of Search .................. 242/55, 67.1 R, 67.2, 242/67.3 R, 67.4; 281/2, 5; 40/417, 471, 518; 53/118, 430; 353/26 A

[56] References Cited

U.S. PATENT DOCUMENTS

| | | | |
|---|---|---|---|
| 3,630,469 | 12/1971 | Turgeon | 242/67.4 X |
| 3,937,927 | 2/1976 | Weigert | 353/26 A |
| 3,958,874 | 5/1976 | Uchida et al. | 353/26 A |
| 4,116,468 | 9/1978 | Marten | 242/67.4 X |
| 4,397,532 | 8/1983 | Webb | 242/67.3 R X |
| 4,469,287 | 9/1984 | Pfister et al. | 242/67.4 X |
| 4,574,557 | 3/1986 | Haberstroh et al. | 242/67.3 R X |

Primary Examiner—Stuart S. Levy
Assistant Examiner—David Werner
Attorney, Agent, or Firm—Barnes & Thornburg

[57] ABSTRACT

An apparatus and method of storing sheets of film-like material has a substrate which is wound and unwound from two rollers. An exposed portion of the substrate extends between the two rollers. A sheet to be stored is placed on the exposed portion of the substrate. The substrate is then further wound onto one of the rollers and unwound from the other roller. A counter determines the portion of the substrate upon which the sheet is stored by counting the revolutions of a counting roller and accumulating a storage count. To retrieve a stored sheet, the substrate is unwound from the roller upon which it was wound when the sheet was stored until the portion of the substrate upon which the stored sheet was placed is exposed. A counter counts the revolutions of the counting roller and causes the unwinding to cease when the storage count determined when the sheet was stored is reached. A bed is urged upwardly against the rollers to maintain tension on the substrate as it is wound and unwound.

16 Claims, 4 Drawing Figures

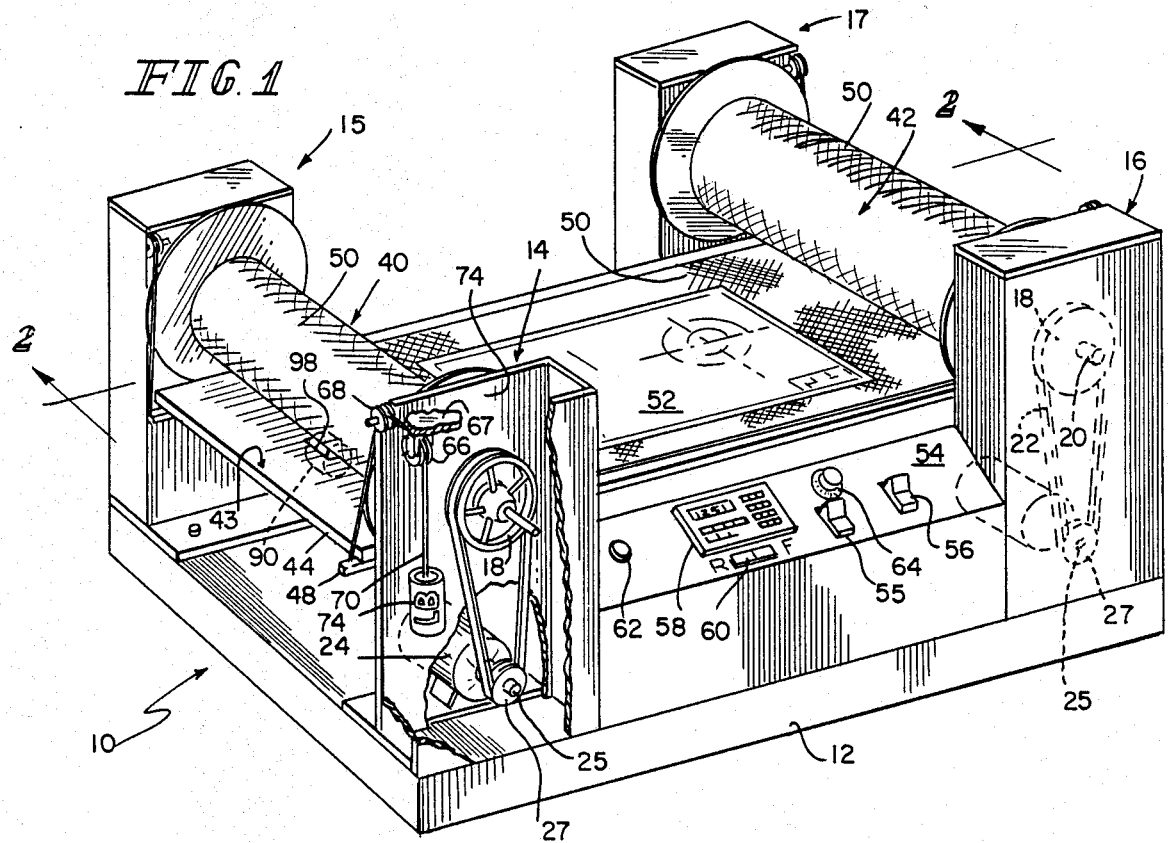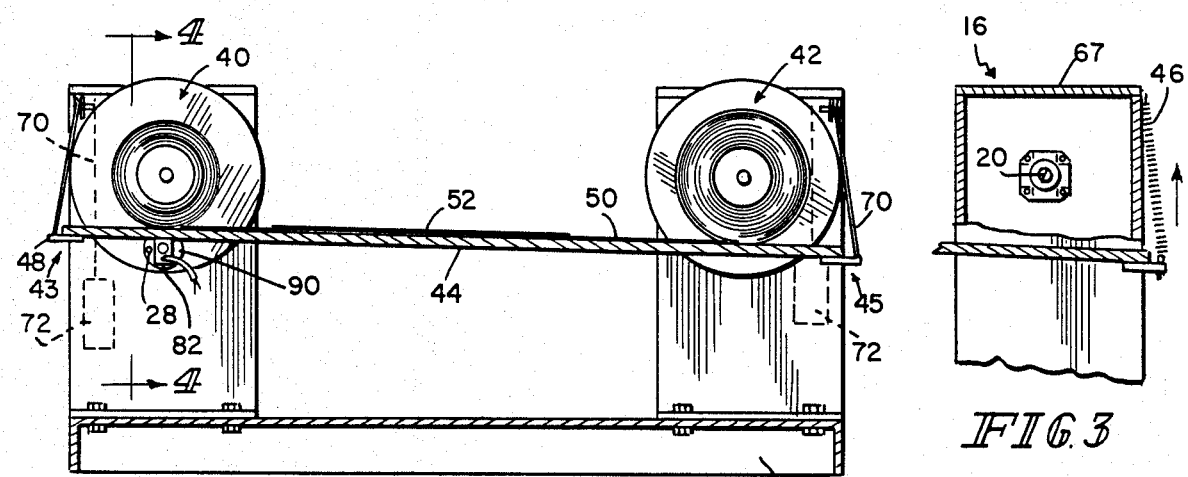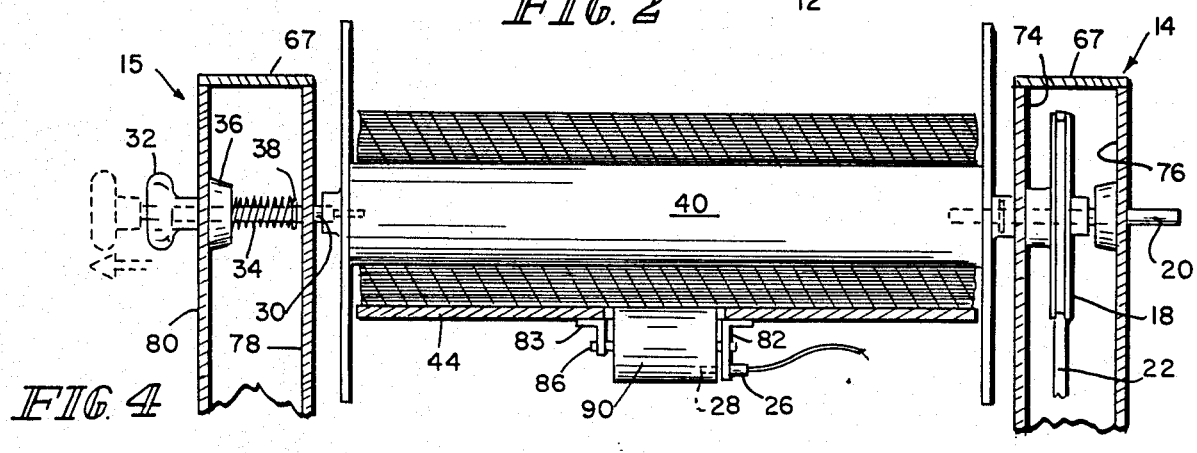

FILM STORAGE SYSTEM

This invention relates to storage systems and more particularly to an apparatus for storing sheets of film like material such as large photographic negatives, blueprints, or plan files.

Blueprints are widely used in a variety of different areas. For example, companies which manufacture products utilize blueprints for product design. The contruction industry also uses blueprints extensively. In the advertising industry, large photo negatives are used for layouts of advertisements which appear in magazines and the like. These photo negatives are in many cases 24"×24" or larger. Engineering departments use plan files extensively.

Heretofore, horizontal drawers have been used to store blueprints and large photo negatives. The blueprints are typically stacked in the drawers in some type of seguential order. The photo negatives are typically placed between sheets of folded paper and then placed in horizontal storage drawers in a manner similar to blueprints. Hanging files have also been used to store blueprints and plan files.

Retrieval of blueprints, photo negatives, or plan files stored in this manner is awkward in that it reguires a person who wants a particular blueprint or photo negative to thumb through the stack of material in the drawer. When doing so, it is not uncommon for a corner of the blueprint of photo negative to be torn or broken off, or kinked. Although this is usually only a minor inconvenience in the case of blueprints, it can cause the total destruction of a photo negative. As an advertising photo negative is the result of substantial investments in both time and money, it is desirable that a safer storage system be used. Further, if a cup of coffee or a soft drink is being held by the person retrieving the blueprint or photo negative, or if set on the storage cabinet, it can be spilled into the drawers or hanging file, destroying the contents.

It is an object of this invention to provide a system for storing sheets of film like material such as blueprints or large photo negatives which eliminates the need to thumb through stacks of sheets.

It is an object of this invention to provide a storage system for sheets of film like material wherein each stored sheet is substantially isolated from other stored sheets eliminating the possibility of destroying several sheets due to spills or other calamities.

It is an object of this invention to provide a storage system for sheets of film like material which ensures the physical integrity of the stored sheets and provides for ease of storage and retrieval.

It is an object of this invention to provide a particular retrieval means which works accurately and swiftly, thus saving time.

An apparatus for storing sheets of film like material in accordance with this invention has spaced apart parallel rollers. A substrate of non-abrasive material is wound on the two rollers. The two rollers are spaced apart such that a portion of the substrate extending between the two rollers is exposed. The rollers are supported by a base which also supports a movable bed. One roller extends across each end of the movable bed. The movable bed is suspended beneath the two rollers and each end of the movable bed is urged against a respective roller. Means are provided for rotating a selected one of the rollers to wind the substrate on the selected roller and unwind it from the other roller.

When it is desired to store a sheet of film-like material, the sheet is placed on the exposed portion of the substrate. The substrate is then wound onto one of the rollers. A counting means is provided for indicating the longitudinal position of the substrate. After an empty roll of substrate is loaded onto the apparatus and its free end threaded onto the other roller, the counter is set to zero. As the substrate is wound onto the other roller as sheets are stored, the counter counts an indicator such as the revolutions of a counting roller mounted in a slot in the moveable bed and in contact with the substrate. This is called the first counting means. As each sheet is placed on the substrate for storage, the count on the counter is noted, this count is called a storage count. After the substrate has been completely wound onto the roller, the ending count is also noted.

When it is desired to retrieve a sheet of stored material, the counter is preset to the ending count for the filled substrate roll. The storage count indicative of what portion of the substrate on which the sheet is stored is then entered into the counter. The free end of the filled substrate roll is then threaded onto the empty roller and the empty roller rotated. The counter then counts down to the desired count as the substrate moves over the counting roller and automatically stops the roller at the desired location. This is the second counting means or retrieval count. The desired sheet is then on the exposed portion of the substrate for retrieval. In order to increase accuracy a mark can be provided on the substrate to determine how far to thread the substrate on the empty roll.

Additional features and advantages of the invention will become apparent to those skilled in the art upon consideration of the following detailed description of a preferred embodiment exemplifying the best mode of carrying out the invention as presently perceived. The detailed description particularly refers to to the accompanying figures in which:

FIG. 1 is a perspective view of an apparatus constructed in accordance with this invention;

FIG. 2 is a section view of the apparatus of FIG. 1 taken along the line 2—2 of FIG. 1;

FIG. 3 is a perspective side view showing a bed urging mechanism of this invention; and FIG. 4 is a section view taken along the line 4—4 of FIG. 2.

Referring to FIGS. 1, 2, and 4, a scroll filing machine 10 constructed in accordance with this invention is shown. Scroll filing machine 10 has a rectangular base 12. Hollow rectangular support columns 14, 15, 16, 17 extend upward from each corner of base 12. Illustratively referring to rectangular support column 14, each retangular support column 14, 15, 16, 17 includes an inner wall 74 and an outer wall 76.

Support columns 14, 16 each have a spindle 20 extending through an upper portion with a pulley 18 mounted thereon. As can be seen more clearly with respect to support column 14 in FIGS. 1 and 4, pulley 18 is mounted on spindle 20 between inner wall 74 and outer wall 76.

A motor 24 is mounted on base 12 beneath each pulley 18. Each motor 24 incudes a shaft 25 upon which a motor pulley 27 is mounted. A belt 22 is entrained upon each motor pulley 27 and pulley 18. Each pulley 18 is thus a conventional belt driven pulley.

As shown by support column 15 in FIG. 4, each support colum 15, 17 has an inner wall 78 and an outer wall 80. Spindles 30 extend transversely through an upper part of support columns 15, 17. Retaining washers 38 are fixedly mounted on spindles 30 generally adjacent inner walls 78. Spindles 30 extend outwardly through collars 36 which are mounted on inner surfaces of outer walls 80. Knobs 32 are attached to the outer ends of spindles 30. Springs 34 are mounted on spindles 30 between washers 38 and collars 36 and urge spindles 30 inwardly.

A roller 40 is removably mounted on spindles 20, 30 which extend through support walls 14, 15, respectively. To mount roller 40, or to remove it, knob 32 is pulled in the direction indicated by the dotted arrow in FIG. 4. This pulls the inner end of spindle 30 axially outward which permits roller 40 to be placed onto spindle 20 or removed from spindle 20. Knob 32 is then released and spindle 30 is urged inwardly by spring 34 pushing the inner end of spindle 30 into roller 40 to secure roller 40 on spindles 20, 30. A roller 42 is removably mounted on the spindles 20, 30 which extend through support columns 16, 17, respectively, in the same manner.

A movable bed 44 is supported at each of its corners 48 from support columns 14, 15, 16, 17 by cables 70. Illustratively referring to support column 14, a pulley 66 is illustratively mounted from a top number 67 which extends across the top of support column 14. A second pulley 68 is mounted for rotation on an outer surface of inner wall 74 of support column 14. Illustratively, pulleys 66, 68 are mounted at generally an upper and outer edge of inner wall 74. A cable 70 is secured at one end to the corner 48 of moveable bed 44. Cable 70 is threaded through pulleys 66, 68 and a weight 72 attached to the other end of cable 70. Weight 72 exerts a downward force on cable 70 which is translated into a force urging corner 48 of moveable table 44 upward by pulleys 66, 68. This arrangement has the advantage of urging corner 48 upward with a uniform force regardless of the vertical location of the edge, illustratively edge 43, of moveable bed 44.

The fabric substrate 50 is adapted to be wound on rollers 40, 42. A sheet of film like material 52 to be stored is placed on substrate 50 and one of rollers 40, 42 rotated to roll substrate 50 onto it to store sheet 52.

Base 12 also includes a control panel 54, including counter 58, a lighted directional selector switch 60, a bump switch 62, illustratively a push-button switch, and a speed control 64 are all mounted in control panel 54. A machine control circuit (not shown) is also mounted in control panel 54, the complete function of which will be apparent to one of ordinary skill in the art from the following discussion. Control panel 54 is illustratively only and other panels may be used depending on the type and size of machine ordered. A foot control (not shown) is another optional feature associated with the control panel 54.

A proximity switch 26 is mounted on a bracket 82 which is attached to a moveable bed 44. A proximity switch actuator 28 is mounted on a counting roller 90. Counting roller 90 is attached to brackets 82, 83 by shaft 86. Counting roller 90 protrudes through bed 44 and contacts substrate 50. Since moveable bed 44 is urged upward, counting roller 90 is assured continuous contact with a fabric substrate 50. As substrate 50 is moved over counting roller 90, the counting roller 90 turns and proximity switch actuator 28 turns as well As counting roller 90 rotates, the proximity switch actuator 28 on the counting roller actuates the proximity switch 26 each time the roller 90 makes a complete rotation. Each time this particular proximity switch 26 is actuated, it will cause a counter 58 to count one unit.

Illustratively, counter 58 is shown to be a Series 7910 Programmable Predeterming Counter from Vonnegut Industrial Products, Inc. of Indianapolis, Ind. Other types of counters could be used as well. The control panel 54 is illustrative as well and other types of panels could perform the same function. Illustratively, proximity switch 26 is a magnetic proximity switch and proximity switch actuator 28 is a metal rod extending outwardly towards bracket 82. Each time counting roller 90 makes one revolution, proximity switch actuator 28 will come in close proximity to the associated proximity switch 26 thereby actuating proximity switch 26. Proximity switch 26 need not be a magnetic proximity switch and could be a photoelectric eye, a mechanically actuated limit switch, or any other mechanism for sensing revolutions of counting roller 90.

In operation, roller 40 illustratively holds a roll of empty substrate 50 and roller 42 is empty. Rollers 40 and 42 are mounted on respective spindles 20, 30 and the free end of substrate 50 threaded onto roller 42. The ends 43, 45 of movable bed 44 are urged by cables 70 connected to weights 72 up against rollers 40, 42, respectively, and maintain tension on substrate 50 as rollers 40, 42 rotate. Moveable bed 44 also supports an exposed portion of substrate 50 which extends between rollers 40, 42. Since movable bed 44 is movably biased against rollers 40, 42, ends 43, 45 of movable bed 44 will move up and down as substrate 50 is wound onto and off of rollers 40, 42.

To being storing sheets, counter 58 is set to zero. Directional switch 60 is positioned so that roller 42 will rotate when bump switch 62 is depressed. A sheet 52 of film like material, illustratively a blueprint or a photo negative,is placed on the exposed portion of substrate 50. The getting on counter 58 is recorded and bump switch 62 then depressed. This energizes the motor 24 associated with roller 42 causing roller 42 to rotate. This winds substrate 50 onto roller 42. As substrate 52 mores over moveable bed 44, substrate 52 turns counting roller 90. Counting roller 90 is attached to moveable bed 44 by brackets 82, 83 and counting roller 90 protrudes through moveable bed 44 through slot 98 thereby being on contact with substrate 50. Since moveable bed is movably biased against rollers 40, 42, counting roller 90 will remain in contact with substrate 50.

As counting roller 90 rotates, the proximity switch actuator 28 moves as well, thus actuating proximity switch 26 mounted on bracket 82 each time counting roller 90 makes a complete rotation. Each time this particular proximity switch 26 is actuated, it will cause counter 58 to count one unit.

When roller 42 has roated long enough to wind substrate 50 onto it such that the sheet 52 has been wound onto roller 42, bump swich 62 is released. This deenergzes the motor 24 associated with roller 42 so that roller 42 stops rotating. At this point, another sheet 52 of film like material can be placed on the exposed portion of substrate 5 for storage. After this is done the setting on counter 58 is again recorded and the procedure repeated. This procedure is continued until all of substrate 50 has been unwound from roller 40 and wound onto roller 42. At this point in time, the last setting on counter 58 is recorded and the roller 42 which contains the stored sheets 52 can be removed and placed in a storage rack which can contain any number of similar rollers.

When it is desired to retrieve a sheet 52 of stored material, the appropriate roller 42 is mounted on the spindles 20, 30 which extend through support columns 16, 17, respectively. An empty roller 40 is then mounted on the spindles 20, 30 which extend through support columns 14, 15, respectively. The free end of substrate 50 is threaded onto roller 40. Counter 58 is preset to the count which was recorded when substrate 50 had been fully wound onto roller 42. The count on counter 58 which was recorded when the desired sheet 52 was placed on the exposed portion of substrate 50 for storage is then entered into counter 56. Directional switch 60 is moved to the position to cause roller 40 to rotate. Counter 58 automatically will de-energize motor 24 when the desired count is reached. The exposed portion of substrate 50 will then hold the sheet 52 which is desired to be retrieved.

In less expensive models or as an alternative means, manual operation of counter 58 can be used. Bump switch 62 is depressed which energizes the motor 24 associated with roller 40. Motor 24 will then cause roller 40 to rotate, winding substrate 50 onto roller 40 and unwinding it from roller 42. As roller 40 rotates, the proximity switch actuator 28 on the pulley 18 mounted in support column 14 actuates the proximity switch 26 mounted in support column 14 each time roller 40 makes a complete rotation. Each time this particular proximity switch 26 is actuated, it causes counter 58 to count down one.

Motor 24 will continue to rotate, thereby rotating roller 40 and winding substrate 50 onto roller 40, until the count counted by counter 58 matches the count which was entered into counter 58. At this point, the motor 24 associated with roller 40 will cease rotation. The exposed portion of substrate 50 will then hold the sheet 52 which is desired to be retrieved.

Control panel 54 is shown with a lighted power switch 56 used for turning power on and off. Also included is a lighted off on switch 55 so that two circuits are provided for switching power into the control panel 54. In the illustrative drawing off-on switch 55 is also lighted.

Referring to FIG. 3, an alternative mechanism for urging a corner 48 of moveable bed upward is shown. Springs 46 are secured to the top corners of support columns 14, 15, 16, 17. The other ends of Springs 46 are secured to the corners 48 of moveable bed 44. Moveable bed 44 is thus suspended by springs 46 beneath rollers 40 and 42. One end 43 of moveable bed 44 is urged by respective springs 46 up against roller 40 and the other end 45 of moveable bed 44 is urged by respective springs 46 up against roller 42.

The scroll file apparatus not only permits retrieval of stored sheets 52, but also stores the sheets 52 out of the atmosphere. Further, the sheets 52 need not be handled excessively as in the case of flat or hanging files. By storing a filled roller 42 in an appropriate container, the sheets 52 which are stored are also protected from damage due to spills, leaks or other calamities. The scroll file apparatus described could also be adapted to interface with a computer to permit storage of location numbers and permit automatic retrieval.

Although the invention has been described in detail with reference to certain preferred embodiments and specific examples, variations and modifications exist within the scope and spirit of the invention as described and as defined in the following claims.

What is claimed is:

1. An apparatus for storing and retrieving sheets of film-like material, comprising
   a movable bed;
   a pair of rollers;
   a base including roller mounting means for mounting one roller above each end of the bed and bed urging means for urging each end of the bed against the roller mounted above it;
   a substrate for holding the sheets which is adapted to be wound onto and unwound from the rollers and having an exposed portion extending between the rollers which is supported by the bed, the exposed portion of the substrate receiving the sheet of film-like material to be stored.
   rotating means for rotating a selected one of the rollers to wind the substrate onto it and to unwind the substrate from the other roller to store and retrieve the sheets;
   determining means for determining a portion of the substrate on which a particular sheet of film like material to be retrieved is stored; and
   retrieval means responsive to the determining means for causing the rotating means to rotate a selected roller to expose the portion of the substrate on which the particular sheet of film-like material desired to be retrieved is stored.

2. The apparatus of claim 1 wherein the roller mounting means comprises the base having two spaced apart pairs of upwardly extending opposed support columns in spaced relation to each other wherein each pair of support columns includes means for removably and rotatably receiving one of the rollers and supporting said received roller at generally upper ends of said pair of support columns.

3. The apparatus of claim 2 wherein the bed is generally rectangularly shaped having a corner adjacent each support column, the bed urging means comprising each support column having a pulley rotatably mounted at an upper end thereof, a cable having a weight at one end and being secured at its other end to a corner of the bed adjacent the support column, the cable extending from the bed corner, over the pulley, and down.

4. The apparatus of claim 2 wherein the bed is generally rectanguarly shaped having a corner adjacent each support column, the bed urging means including each corner having a spring secured thereto at one end of the spring, the other end of each spring secured to the support column adjacent the bed corner at generally a portion of the support column above the roller supported by the support column.

5. The apparatus of claim 1 wherein the determining means includes means for sensing each revolution of a counting roller, first counting means responsive to the sensing means for counting each revolution to accumulate a first count, the accummulated first count comprising the portion of the substrate upon which a given sheet is stored.

6. The apparatus of claim 5 wherein the counting roller is mounted in a slot located in the moveable bed.

7. The apparatus of claim 5 wherein the retrieval means includes means for causing the rotating means to rotate the selected roller to unwind a roller of substrate containing stored sheets, second counting means for counting each revolution of the selected roller, comparing means for comparing the count counted by the second counting means to a previously determined count indicative of the portion of the substrate on which the desired sheet is stored and causing the rotating means to stop rotating the selected roller when the count counted by the second counting means matches the previously determined count.

8. An apparatus for storing and retrieving sheets of film-like material, comprising
a base having two spaced apart pairs of opposed support columns extending upwardly therefrom;
a pair of rollers;
the support colums including means for rotatably and removably mounting the rollers;
a film like substrate for holding the sheets which has a portion wound on each roller when in use for storing and retrieving the sheets and having an exposed portion extending between the rollers for receiving a sheet to be stored and from which a stored sheet can be removed,
a movable bed;
suspending means for suspending the movable bed from the support columns beneath the rollers when the rollers are mounted to the support columns, the suspending means including urging means for urging portions of the bed up against the rollers;
rotating means for rotating at least one of the rollers for winding the substrate onto one of the rollers and unwinding it from the other roller;
counting means for counting each revolution of a counting roller and accumulating a first count, the first count, when a sheet is placed on the exposed portion of the substrate for storage, indicative of a location on the substrate on which the sheet is stored;
retrieval means for retrieving a desired stored sheet including
means for causing the rotating means to rotate at least one of the rollers to unwind a roll of substrate containing stored sheets from one roller and wind it onto the other roller;
second counting means for counting each revolution of the counting roller to accumulate a second count; and
means for comparing the first count indicative of the location of the desired sheet on the substrate with the second count and causing the rotating means to cease rotating the roller when the first and second counts match.

9. The apparatus of claim 8 wherein the suspending means and urging means comprise each support column having a pulley mounted at an upper portion thereof and a cable entrained on each pulley having one end secured to the movable bed and its other end secured to a weight.

10. The apparatus of claim 8 wherein the suspending means and urging means comprises each support column having a spring attached at one end to an upper portion of the support column, the other end of each spring attached to the movable bed.

11. A method for storing and retrieving sheets of film-like material, comprising the steps of
placing a sheet of film-like material on an exposed portion of substrate extending between two rollers, the substrate wound on the rollers;
determining which portion of the substrate the sheet has been placed;
winding the substrate further onto one of the rollers and unwinding it from the other roller to store the sheet;
urging a bed up against the rollers such that each end of the bed is urged against one of the rollers to maintain tension on the substrate as it is being wound and unwound; and
retrieving a particular sheet from the substrate by unwinding the substrate from the roller upon which it was wound during the winding and storing step and winding it upon the other roller to expose the determined portion of the substrate upon which the particular sheet has been stored to permit the particular sheet to be retrieved from the substrate.

12. The method of claim 11 wherein the step of determining which portion of the substrate upon which the sheet has been placed comprise counting each revolution of a counting roller, accumulating a storage count and determining the portion of the substrate upon which the sheet has been placed by the storage count when the sheet is placed on the substrate.

13. The method of claim 11 wherein the step of determining which portion of the substrate upon which the sheet has been placed comprises counting each revolution of a counting roller, accumulating a storage count and determining the portion of the substrate upon which the sheet has been placed by the storage count when the sheet is placed on the substrate.

14. The method of claim 12 wherein the retrieving step includes counting the revolutions of the counting roller when the substrate is being unwound from the roller upon which it was wound during the winding and storing step and accumulating a retrieval count, comparing the retrieval count to the storage count for the sheet to be retrieved and ceasing to unwind the substrate from the roller upon which it was wound during the winding and storing step when the retrieval count matches the storage count.

15. The method of claim 12 further including the step of connecting the counting roller with the substrate through a slot in the moveable bed, the countin roller being rigidly attached to the moveable bed by brackets, so that the counting roller is urged against the substrate as the bed is urged against the roller.

16. The method of claim 11 further including the step of connecting the counting roller with the substrate through a slot in the moveable bed, the counting roller being rigidly attached to the moveable bed by brackets, so that the counting roller is urged against the substrate as the bed is urged against the roller.

* * * * *